Dec. 10, 1935.  C. HARRIS  2,024,097
GREASE DISCHARGE DEVICE
Filed Jan. 25, 1933  2 Sheets-Sheet 2
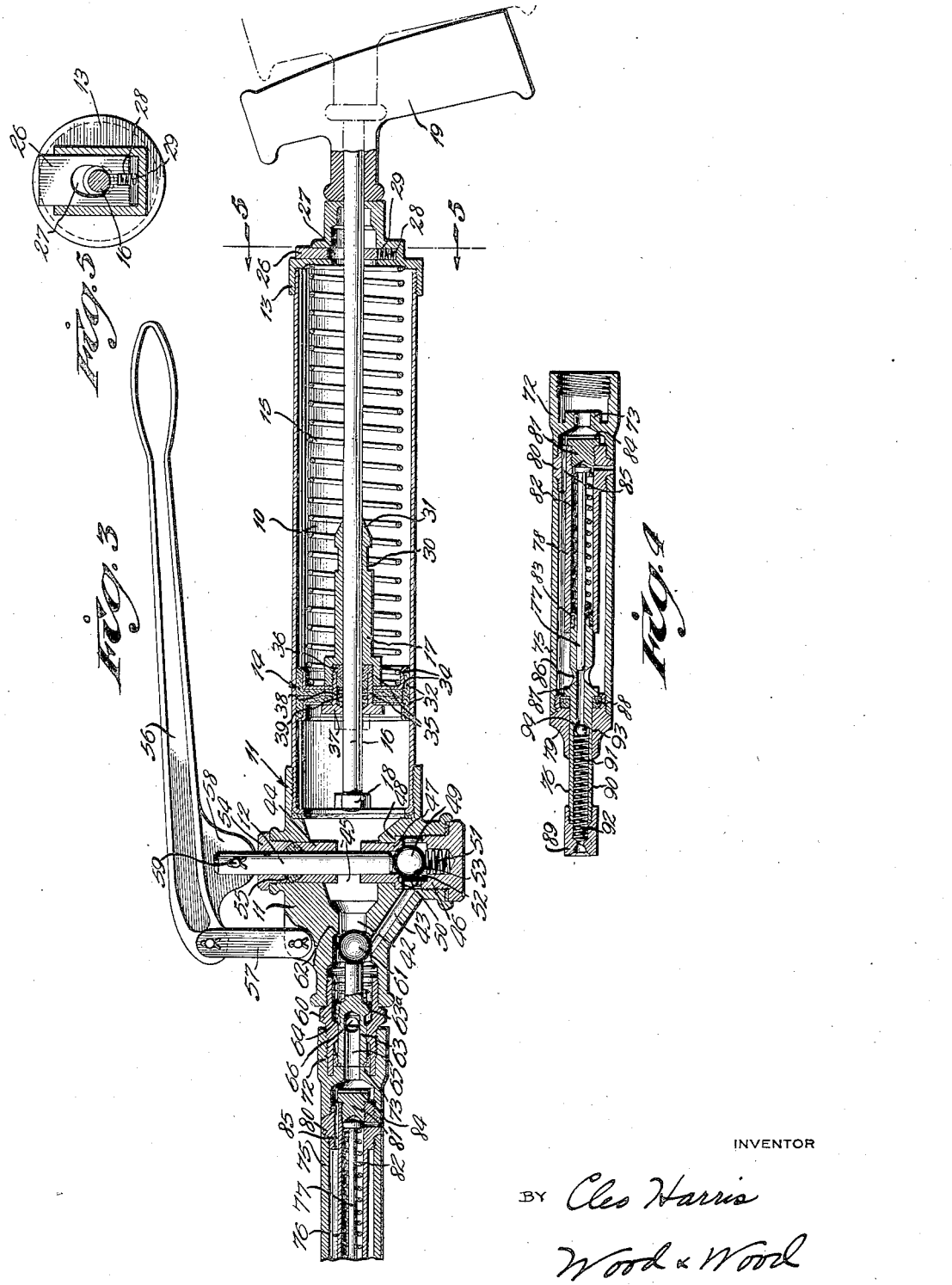
INVENTOR
BY Cleo Harris
Wood & Wood
ATTORNEYS Patented Dec. 10, 1935

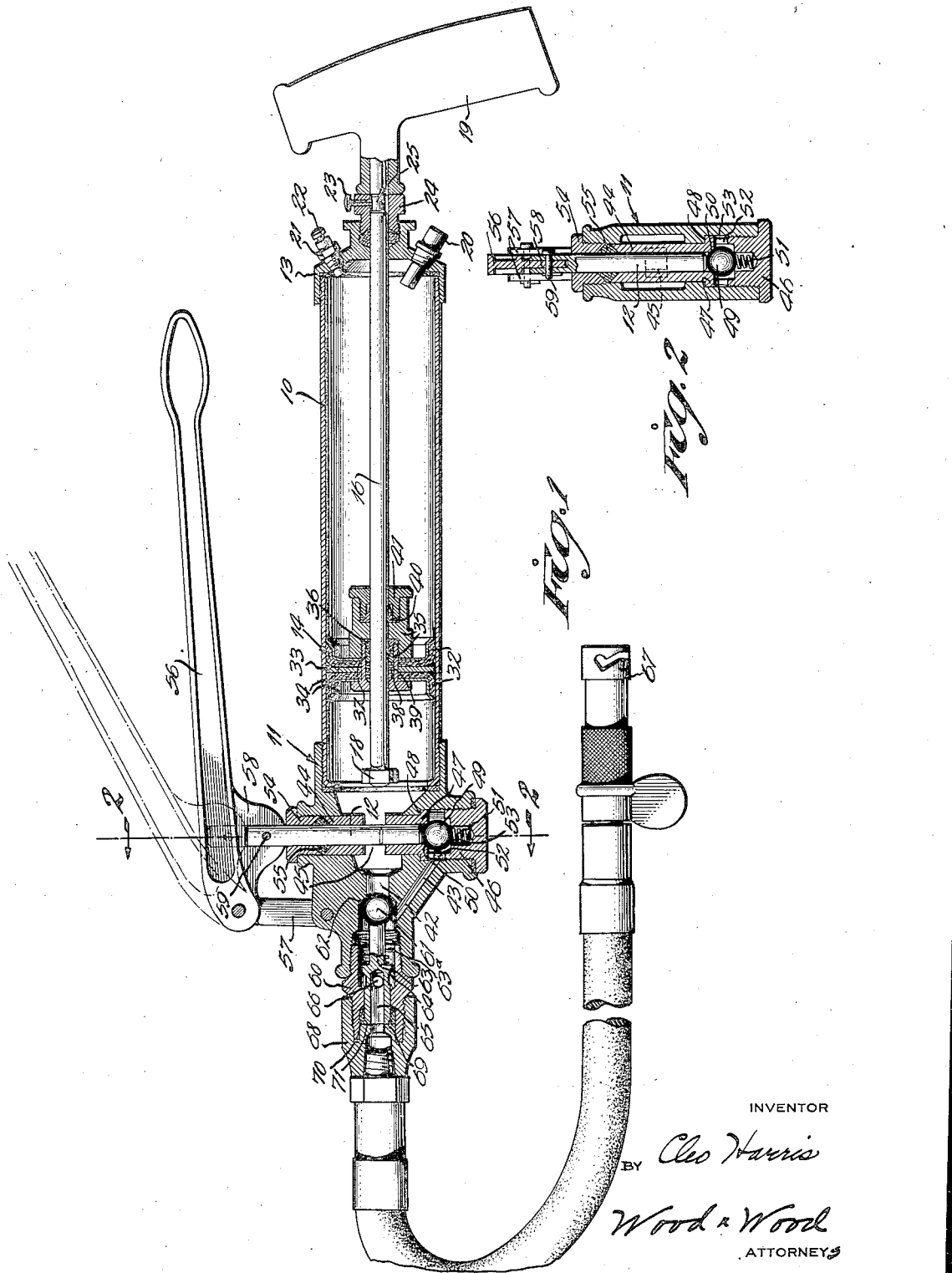

2,024,097

UNITED STATES PATENT OFFICE 2,024,097

GREASE DISCHARGE DEVICE

Cleo Harris, Cincinnati, Ohio, assignor to The Cincinnati Ball Crank Company, Cincinnati, Ohio, a corporation of Ohio Application January 25, 1933, Serial No. 653,462

13 Claims. (Cl. 221—47.3)

This invention relates to lubricating apparatus and is particularly directed to improvements in small portable hand operated grease supply pumps or guns designed for servicing lubricating fittings and the like.

In the art of lubrication there are two general types of valved fittings to be serviced. The first of these is of the form known as a pin fitting and includes extended pins which cooperate with bayonet slots in a coupling device at the end of a grease discharge hose, the hose usually being flexible, and the second being of the type known as the butt or push-on type to which the discharge means of the pump is applied by body pressure at the time of discharge. In the servicing of the latter form of fitting it is preferable to use a booster delivery means which is of telescopical form and includes plunger mechanism operated by pressing the gun toward the fitting against which the delivery means is abutted. In the delivery of grease to either form it is necessary to develop a fairly high pressure for forcing the grease into the fitting particularly in cases where the fitting may be clogged.

It is therefore an object of this invention to provide a hand operated lubricating pump of the small portable type which by an interchange of discharge means may be used for servicing either the pin type of fitting or the push-on or butt type of fitting, and which pump in either type of service includes means for developing sufficient pressure for efficient delivery of grease to the fittings. The pressure developing instrumentality in the case of the delivery hose connection to a pin fitting is in the form of a lever on the gun operating a pressure development piston and in the case of the push-on or butt type of fitting is in the form of a booster including a plunger in a telescopical assembly operated by movement of the gun bodily toward and from the fitting against which the booster is butted. In other words, the principal feature of improvement is in the provision of a combination lever operated and push-on lubricating pump.

It is another object of this invention to provide for interchangeable connection to the front end of the pump which accomplishes control of the delivery flow control valve in the pump for the respective types of pressure discharge.

It is a further object of this invention to provide improved means for holding the spring urged follower plate in retracted position during pump filling operations.

It is a still further object to provide an improved push operated pressure development delivery or booster means for attachment to a lubricant pump.

Other objects and further advantages will be more fully apparent from a description of the accompanying drawings, in which:

Figure 1 is a longitudinal sectional view of the combination lever and push type hand operated grease pump of this invention, showing a discharge hose connected thereto for delivery of grease by operation of the hand lever.

Figure 2 is a sectional view taken on line 2—2, Figure 1, detailing the operative connection between the hand lever and piston and detailing the piston and cylinder assembly.

Figure 3 is a longitudinal sectional view of the combination lever and push type hand operated grease pump shown in Figure 1 but illustrating a push type discharge means or booster attached thereto replacing the delivery hose of Figure 1.

Figure 4 is a longitudinal sectional view of the push type discharge means or booster shown apart from the grease pump.

Figure 5 is a sectional view taken on line 5—5, Figure 3, detailing a latch mechanism for holding the follower piston of the pump in retracted position during filling and assembling operation.

As shown generally in Figures 1 and 3, the hand operated grease pump is converted from a lever type of delivery for pin fittings to a push type of delivery for butt fittings by interchanging a discharge hose as shown in Figure 1 and a push type booster means as shown in Figure 3. The connection of the discharge hose includes means for locking a low pressure grease supply or feed control valve in seated or closed position whereby the grease may be fed solely by means of a piston and its operating lever. In the instance of the push type or booster, the connection to the gun includes means which does not seat the low pressure supply flow control valve so that the grease fed from the follower plate may move at all times into the booster where discharge pressure is imparted by the operation of plunger mechanism in the booster.

It is also possible to use a nozzle extension in conjunction with the gun of this invention, which does not have an attachment or abutment means at its end, for use in discharging the grease from the gun into gear boxes, etc. This type of discharge tube or nozzle extension would include control means for operating the valves in the same manner as the booster described herein, and therefore does not require specific description. In other words, it would unseat the outer valve and be ineffective for seating the inner valve, thereby permitting low pressure flow from the gun under the action of the follower plate therof.

Describing the grease pump and directly referring to the drawings, a supply barrel 10 is provided including a forward head 11 of extended structure which head carries the scissor lever operated plunger 12 by means of which the grease may be discharged from the head under high pressure. The rear end of the barrel is closed by means of a closure cap 13. A follower piston or plate 14 is mounted in the barrel and is normally moved forwardly therein either by means of compressed air introduced into the barrel or cylinder 10 in back of the follower plate 14 (see Figure 1) or by means of a coil spring 15 under compression between the follower plate and the end closure cap 13 (see Figure 3).

This follower plate 14 is retracted during loading operations by means of a rod 16 slidably mounted within a hub 17 of the follower piston and in the closure plate 13. This rod 16 includes a head or nut 18 on its inner end adapted to be drawn against the forward face of the follower plate when the retraction rod is drawn rearwardly by means of a handle 19 fixed on the extended end thereof beyond the end closure 13. In the operation of loading the barrel 10, the barrel is unscrewed from the head 11 and the follower plate or piston 14 is drawn back into the cylinder after the open forward end of the barrel or cylinder has been completely immersed in the supply of grease, this action sucking the grease into the barrel.

In the form of follower plate control shown in Figure 1, compressed air is used, the compressed air being introduced by coupling an air supply hose to a stem 20 or air fitting including a conventional valve (not shown) which stem is screwed into the rear closure head 13. The air is vented or released through a safety valve 21 which will unload either to excessive pressure or to the pressure of the thumb on the operating head 22 thereof.

Normally, with the gun loaded and the air pressure in back of the follower plate the retraction rod is maintained in position in the follower plate enclosure, whereby it is free to rotate and permit swivelling of the handle but is maintained against longitudinal displacement by means of a set screw 23 screwed radially through a packing gland 24 for the rod in the rear closure, the set screw engaging into an annular groove 25 in the rod. During the operation of loading, the set screw 23 is unscrewed to permit retractive movement of the rod and after the grease has been drawn into the barrel and either prior to assembly or thereafter the rod is shoved forwardly into the barrel through the follower plate and the set screw 23 re-set as shown in the drawings.

In the form of follower plate control shown in Figure 3, wherein a compression spring 15 is used, it is necessary to hold the follower plate 14 in retracted position against the action of the spring after loading and until the barrel is reassembled by screwing it into the forward head. For this purpose a latch mechanism is provided (see Figures 3 and 5). The latch 26 is a plate slidably mounted in the closure 13 at right angles to the rod which includes an aperture 27 traversed by the rod, which aperture is of larger diameter than the hub 17 of the follower plate.

The latch is spring urged by means of a spring 28 under compression in the base of the slot 29 in which it moves and the latch is designed to register with an annular groove 30 in the hub of the follower plate, the tapered end 31 of the hub 17 passing through the opening into a clearance bore of the rear closure. This latch operates automatically when the rod is retracted, snapping into position to hold the follower plate in retracted position until intentionally released by thumb pressure after assembly of the gun to permit the follower plate to impart a feeding action to the grease for moving it into the forward head of the pump.

The follower piston 14 in both forms includes a pair of oppositely disposed gaskets 32, 32, a plate or washer 33 being interposed if desired, and gasket support plates 34 at the outer sides of the respective gaskets. The assembly of plates and gaskets is maintained by means of hub sections 35, 35 screwed together and clamping upon the assembled parts and including packing. Packing for the rod 16 consists of a gasket 36 disposed about the rod and a circular wedge 37 forcing the packing into engagement with the rod under the action of a compression spring 38 in the bore 39 of one of the elements. A second packing 40 may be provided as shown in Figure 1 also being of wedge type and urged against the rod by means of a packing gland 41.

In connection with the two forms, that is, the spring urged follower piston and the air operated follower piston, it is pointed out that a gun embodying either one or the other may be of the convertible type, that is, may receive either the hose attachable to pin fittings for high pressure discharge under the action of the high pressure hand lever operated piston or may receive a push type pressure booster adapted to butt fittings and creating a high pressure by longitudinal movement of the gun.

The head of the grease pump is hollow for receiving the grease from the barrel and includes two passageways 42, 43 to the forward or discharge end, one namely 42 being axially of the cylinder head and the other namely 43 obliquely to the discharge end from a lower end of the high pressure lever operated piston 12 and its cylinder. The high pressure piston 12 is mounted for operation across the hollow main head 11 within a removable cylinder 44 which includes intake openings 45 disposed adjacent the chamber in the head. The cylinder 44 is held in place by means of a combined valve carrier and cylinder retainer element 46 screwed into the lower end of the bore of the head, which receives the cylinder, and engaging against the headed lower end 47 of the cylinder clamping the head against a shoulder 48 of the bore.

A ball valve 49 is contained in the bore of this retainer element and is urged against a seat 50, formed on the lower end of the cylinder, by means of a spring 51 under compression in a spring bore of the retainer element. This combined valve carrier and cylinder retainer element is plurally longitudinally slotted adjacent the ball valve, the slots 52 communicating with an annular recess 53 formed by a groove in the outer face of the retainer element adjacent the oblique discharge passageway 43.

The upper end of the cylinder is inclined downwardly and a wedge packing ring 54 is urged against the upper end of the cylinder by means of a packing gland 55 for sealing the piston. The piston is reciprocated by means of a hand lever 56 flexibly connected to the head by means of links 57 and extended longitudinally along the gun. This lever includes a longitudinally arranged lug 58 engaged in a slot at the upper end of the piston and pivotally connected thereto by means of a pin 59.

A nipple 60 is screwed into the forward end of the head in the axial discharge passageway 42 thereof and a flow control ball valve 61 is loosely contained within the chamber of this discharge bore for movement relative to a seat 62. A valve and control plunger element 63 is slidably mounted in the nipple and includes an intermediate seating shoulder 64 moving in a counterbore of the nipple but sufficiently clear of the wall thereof to permit the passage of grease. A spring 63ª normally seats the element 63. Beyond the shoulder and toward the outer end, the plunger is tubular as at 65, and radial apertures 66 are provided adjacent the shoulder to permit the flow of grease outwardly through the nipple. The extended inner end of the plunger is adapted to engage the ball valve 61 and to control the same depending on the maintained position of the plunger which is acted on by the type of discharge means utilized.

In Figure 1 the hose type of discharge means is shown, which hose is connectible and adapted to be locked on a pin type of fitting by means of a rotatable bayonet slotted coupling 67 at the end of the hose, which connection is of well known construction.

The attached inner end of the hose includes a metal attachment sleeve 68 which is adapted to be screwed onto the nipple against the shoulder thereof and includes an internal circular lug 69 engaging in the bore of the nipple and against the outer end of the valve and control plunger element 63 for opening the valve and plunger element 63 and moving the same tightly against the valve 61. A packing gasket 70 is mounted about the outer end of the plunger within the enlarged bore being supported in a groove 71 in the outer end of the plunger so that a seal is effected between the plunger, the nipple and the attachment sleeve 68 of the discharge hose.

The lug 69 is of sufficient length for engaging the ball valve against the seat in the axial passageway so that no flow of grease can take place through this passageway when the pin type of fitting is being lubricated by feed of grease taking place under the action of the scissor type lever and its high pressure piston, whereby the lubricant is by-passed around a locked closed valve 61.

Referring to the second form of device shown in Figures 3 and 4, wherein a push type booster device is secured to the lubricant gun, the connecting sleeve 72 of this booster is similar to the connecting sleeve of the hose in that it is screwed onto the nipple and an internal circular lug 73 is disposed so as to move into the counterbore of the nipple and engage against the end of the combined valve and plunger element 63 for opening the same. However, the lug is of shorter length than that of the first form so that it does not move the combined valve and plunger element as far, the element thereby simply providing a stop for outward movement of the flow control valve 61 but the flow control valve being free to move from its seat under the discharge or feed pressure of the follower plate or piston. Therefore grease may be delivered past the ball valve, through the plunger and into the push type discharge means.

The push type booster device, shown in Figure 4, generally described includes telescoping elements 75 and 76. The element 75 is the main body or support and carries a plunger rod 77 moving in the bore of the outer tubular telescopical element 76. The connecting sleeve 72 is connected by screw-threading to the end of the body element 75.

The element 75 is formed of three principal parts, namely, a central sleeve 78 and end closures 79 and 80. The outer end closure is bored to receive the tubular telescopical element 76 to permit telescopical movement of this element therein. The rear closure 80 includes a sleeve hub extending within the sleeve of the body and supporting the inner end of the outer telescopical discharge element 76.

The plunger rod 77 cooperating with the discharge tube 76 is mounted within the bore of the sleeve hub and projects into the end of the tubular telescoping member 76. The inner end of this plunger rod is headed and lies against a plug 81 screwed into the end of the closure head 80, the plunger being urged against this plug by means of a coil spring 82 under compression about the plunger rod and between the head thereof and the inner end of the element 76. The end of the element 76 includes a gasket 83 providing a sealing sliding fit in the sleeve hub.

The grease passing through the connecting sleeve 72 passes by the plug 81 through a cross groove 84 thereof and through a longitudinal passage 85 in the closure 80 communicating with the space between the sleeve 78 and the sleeve hub of the closure element 80. The grease thus packed into the device passes into the tubular telescopical element 76 by way of radial ports 86 entering in front of the plunger rod when the compression spring has moved the element 76 outwardly after a discharge operation.

Outward movement of the telescopical element 76 is limited by means of an intermediate external shoulder 87 thereon engaging the inner side of the closure head 79. A sealing gasket 88 is included in this head preventing loss of grease through the sliding joint of the telescopic parts. The discharge element 76 includes a discharge head 89 which has its outer discharge end formed to fit against a push-on type of fitting at any desired angular position. The head 89 is screwed on the end of the main tubular section 90 of this element A coil spring 91 under compression is mounted within the counterbore of the element 76 between a shoulder 92 in the head end thereof and a ball valve 93 normally engaged against a valve seat 94. The valve 93 will open to discharge pressures induced by movement of the plunger rod into the tubular ejecting element 76.

When this booster device of the push-on type is screwed onto the hand gun, the flow control valve 61 of the hand gun is not pushed against its seat and the grease is urged or packed at all times under follower plate pressure from the hand gun reservoir through the entire assembly to the bore in front of the plunger rod 72 so that when the booster is placed against the push-on fitting and longitudinal pressure is exerted on the hand gun, the telescopical movement of the booster parts will cause a high pressure ejection of grease into the fitting.

Having described my invention, I claim:

1. A lubricant pump, comprising, a main head, a lubricant supply barrel attached to said head, said head including a low pressure lubricant passageway therethrough, a valve controlling said passageway, said head including a high pressure passageway extending from the supply end of the head to the outlet passageway of the head beyond the valve, a lever operated pressure piston for forcing grease through said second passage, and a discharge conduit attachable to said head including a connection for operating said valve.

2. In a lubricant pump, a main head, a supply chamber connected to the head, said head including a low pressure discharge passageway extending therethrough, a valve controlling said passageway and adapted to open to supply of lubricant from the chamber, a combined valve operating and valve element mounted in the head cooperating with the first mentioned valve and adapted to close to lubricant supply pressures, a discharge hose adapted to be coupled to a pin fitting, said hose including a connection unseating the combined valve operating and valve element and seating the other valve, said head including a high pressure discharge passageway extending from the supply chamber to a point in the low pressure passageway in front of the valve, and high pressure means for forcing lubricant through said high pressure passageway.

3. A lubricant pump including a discharge head, said head including a low pressure lubricant outlet passageway therethrough, a valve controlling said passageway, said head including a high pressure outlet passageway extending from the supply end of the head to the outlet passageway of the head beyond the valve, a lever operated pressure piston for forcing grease through said second passage, and attachment means for alternately securing interchangeable discharge conduits to said head, one of said discharge conduits adapted to lock the valve in closed position.

4. In a grease gun head construction, a grease gun head having an intake opening for grease from a reservoir, a discharge nozzle, said head including a passageway between said nozzle and said intake opening, a valve seat in said nozzle, a second valve seat in said passageway, a valve device in said passageway between said seats and adapted to be selectively seated against either of them, a booster pump between said intake opening and said passageway, and a discharge coupling including means for operating said valve device.

5. A grease gun head construction for use with a reservoir having grease under pressure therein, comprising, a grease gun head connected with said reservoir and having a discharge nozzle, said head including a passageway between said nozzle and said reservoir, a valve seat in said discharge nozzle, a second valve seat in said passageway, a valve device in said passageway adapted to be selectively seated against either of said seats or positioned intermediate of said seats spaced therefrom, a booster pump between said reservoir and the portion of said passageway between said seats, and a discharge coupling attachable to said nozzle and including means for controlling the position of said valve device.

6. A grease gun head construction for use with a reservoir, having grease under pressure therein, comprising, a grease gun head connected with said reservoir and having a discharge nozzle, said head including a passageway between said discharge nozzle and said reservoir, a booster pump between said nozzle and said passageway, valve means in said passageway selectively operable, to close said discharge nozzle and open communication between said passageway and said reservoir, or close communication between said passageway and said reservoir and open said discharge nozzle, or permit communication between said passageway and said reservoir and open said discharge nozzle, and an attachment means for alternately securing discharge couplings to said nozzle, said discharge couplings respectively active on said valve for controlling its position.

7. In a grease gun of the character disclosed, a grease supply barrel, a head at one end of said barrel having a check valve controlled nozzle and a valve controlled discharge passage connecting said nozzle and barrel, the valve for said passage operated through said check valve, said head having a second passage for high pressure dispensation of grease from said barrel to said nozzle, by-passing said valve controlled first passage, a pump for delivering grease under high pressure through said second passage, and a discharge nozzle extension interfittingly connecting with said nozzle arranged to unseat the check valve and position the valve of said valve controlled passage for selectively dispensing the grease through one of said passages, whereby any one of a plurality of discharge nozzle extensions arranged for relatively different control of said valve may be interchangeably connected with said nozzle, the selected extension automatically governing the discharge of grease through a selected one of said passages.

8. In a grease gun of the character disclosed, a grease supply barrel, a head at one end of said barrel having a check valve controlled nozzle and a valve controlled discharge passage connecting said nozzle and barrel, the valve for said passage operated through said check valve, said head having a second passage for high pressure dispensation of grease from said barrel to said nozzle, a pump for delivering grease under high pressure through said second passage by-passing said valve controlled first passage, and arranged to unseat the check valve and position the valve of said valve controlled passage for selectively dispensing the grease through one of said passages, whereby any one of the plurality of discharge nozzle extensions respectively arranged for relatively different control of said valve may be interchangeably connected with said nozzle, the selected extension automatically governing the discharge of grease through a selected one of said passages.

9. In a grease gun head construction, a grease gun head having an intake opening for grease from a reservoir, a discharge nozzle, said head including a passageway betwen said nozzle and said intake opening, a valve seat in said nozzle, a second valve seat in said passageway, a valve device in said passageway between said seats and adapted to be selectively seated against either of them, means constraining said valve device to seat against the valve seat in said nozzle, a booster pump between said intake opening and said passageway, and a discharge coupling including means for operating said valve device against the constraint of said first mentioned means.

10. A lubricant pump, comprising, a main head, a lubricant supply barrel attached to said head, low pressure grease feeding means in said barrel, said head including an axially disposed low pressure lubricant passageway therethrough, a valve controlling flow of grease through said passageway, a high pressure cylinder and lever operated piston disposed across said passageway, said head including a high pressure passageway extending from the discharge end of the cylinder to the outlet passageway of the head beyond said valve, and means for connecting interchangeable conduits to the outlet passageway of said head, one of said conduits adapted to lock the valve in closed position, and the other of which is adapted to permit the valve to remain in unseated position.

11. In a grease gun, a grease reservoir, a head on said reservoir, a nozzle on said head, said head having a low pressure passageway extended from said reservoir to said nozzle, said passageway incorporating a valve seat, a valve in said passageway normally disposed out of contact with said seat but adapted to be engaged thereagainst, said head including a high pressure passageway extended from the reservoir to said low pressure passageway at a point in front of said valve, a pump for delivering the grease under high pressure through said high pressure passageway, a conduit including an extension for engaging said valve against the seat when high pressure service is desired, and means for detachably mounting said conduit on said nozzle.

12. A grease gun head construction for use with the reservoir of the type including a low pressure grease forcing means therein, comprising: a grease gun head connected with said reservoir, a discharge nozzle on said head, said head including a passageway extended between said reservoir and said discharge nozzle, a valve in said nozzle, a valve in said passageway, said nozzle and passageway including seats for the respective valves, said seats facing each other, said head including a by-passage connecting said reservoir to said passageway between said valve seats, a pump mounted in said head for delivering grease through said by-passage under high pressure, and a discharge nozzle extension attachable to said nozzle for unseating said valve in said nozzle.

13. A grease gun head construction for use with a reservoir including a low pressure grease forcing means therein, comprising: A grease gun head connected with said reservoir, a discharge nozzle on said head, said head including a passageway between said discharge nozzle and said reservoir, seats in the discharge nozzle and passageway respectively, said seats facing each other, a valve in said nozzle cooperating with the seat therein, means for normally maintaining said valve in seated position, a valve in said passageway cooperating with the seat of the passageway, said head including a by-passage connecting said reservoir to said passageway between said valve seats, a high pressure pump mounted in said head for delivering grease through said by-passage, and a discharge nozzle extension detachably mounted on said nozzle for unseating said valve in said nozzle against the action of said means which normally maintains it in seated position.

CLEO HARRIS.